United States Patent
Arteaga

(10) Patent No.: US 9,428,982 B2
(45) Date of Patent: *Aug. 30, 2016

(54) DOUBLE VALVE BLOCK AND ACTUATOR ASSEMBLY INCLUDING SAME

(71) Applicant: Cameron international Corporation, Houston, TX (US)

(72) Inventor: Nicolas Arteaga, Houston, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,218

(22) Filed: Oct. 5, 2015

(65) Prior Publication Data

US 2016/0047192 A1    Feb. 18, 2016

Related U.S. Application Data

(60) Continuation of application No. 14/504,284, filed on Oct. 1, 2014, now Pat. No. 9,157,292, which is a division of application No. 13/179,213, filed on Jul. 8, 2011, now Pat. No. 8,931,577.

(51) Int. Cl.
*E21B 33/06* (2006.01)
*E21B 34/04* (2006.01)
*F16K 11/048* (2006.01)
(Continued)

(52) U.S. Cl.
CPC ........... *E21B 33/062* (2013.01); *E21B 33/06* (2013.01); *E21B 34/04* (2013.01); *E21B 34/10* (2013.01); *F16K 11/048* (2013.01); *F15B 13/0405* (2013.01); *Y10T 137/0318* (2015.04); *Y10T 137/2544* (2015.04); *Y10T 137/88046* (2015.04)

(58) Field of Classification Search
CPC .... E21B 33/06; E21B 33/062; E21B 33/064; E21B 34/04; F16K 11/048
USPC ............ 175/5; 166/363, 368, 373, 386, 316, 166/319; 137/102, 614.19; 251/1.1, 1.3, 251/321
See application file for complete search history.

(56) References Cited

U.S. PATENT DOCUMENTS

| | | | | |
|---|---|---|---|---|
| 2,395,941 A | * | 3/1946 | Rockwell | F15B 1/027 137/115.15 |
| 3,038,487 A | * | 6/1962 | Gardner | F16K 11/044 137/112 |
| 4,349,041 A | * | 9/1982 | Bates | E21B 33/06 137/1 |

(Continued)

OTHER PUBLICATIONS

International Search Report and Written Opinion of PCT Application No. PCT/US2012/045746 dated Jan. 14, 2013: pp. 1-7.

*Primary Examiner* — Matthew R Buck
(74) *Attorney, Agent, or Firm* — Chamberlain Hrdlicka

(57) ABSTRACT

A valve comprises a housing including a first chamber, a second chamber, and a neutral chamber. In addition, the valve comprises a stem disposed within the housing. Further, the valve comprises a first valve member at least partially disposed in the first chamber and connected to the stem and a second valve member at least partially disposed in the second chamber and connected to the stem. The first valve member has a closed position seated in a first annular valve seat and an open position spaced apart from the first valve seat. The second valve member has a closed position seated in a second annular valve seat and an open position spaced apart from the second valve seat. Moreover, the valve comprises a biasing member configured to bias the second valve member to the closed position and the first valve member to the open position.

20 Claims, 10 Drawing Sheets

(51) Int. Cl.
*E21B 34/10* (2006.01)
*F15B 13/04* (2006.01)

(56) References Cited

U.S. PATENT DOCUMENTS

| | | | | |
|---|---|---|---|---|
| 4,509,405 A * | 4/1985 | Bates | ............... | E21B 33/06 251/1.2 |
| 4,823,840 A * | 4/1989 | Kosugi | ............... | F16K 11/044 137/625.27 |
| 4,924,911 A * | 5/1990 | Schmalenbach | ...... | F16K 11/048 137/270 |
| 4,955,195 A * | 9/1990 | Jones | ............... | E21B 34/16 137/1 |
| 5,062,349 A * | 11/1991 | Khan | ............... | F15B 11/024 137/625.66 |
| 5,513,790 A * | 5/1996 | Giusto | ............... | B21D 43/11 137/625.66 |
| 5,899,232 A * | 5/1999 | Cardoso | ............... | F16K 11/048 137/625.5 |
| 6,244,560 B1 * | 6/2001 | Johnson | ............... | E21B 33/062 251/1.3 |
| 6,712,092 B2 * | 3/2004 | Toliusis | ............... | F16K 11/048 137/625.27 |
| 8,931,577 B2 * | 1/2015 | Arteaga | ............... | E21B 33/062 137/102 |
| 9,157,292 B2 * | 10/2015 | Arteaga | ............... | E21B 33/062 |
| 2010/0154896 A1 * | 6/2010 | Thrash, Jr. | ............... | F16K 11/044 137/112 |

\* cited by examiner

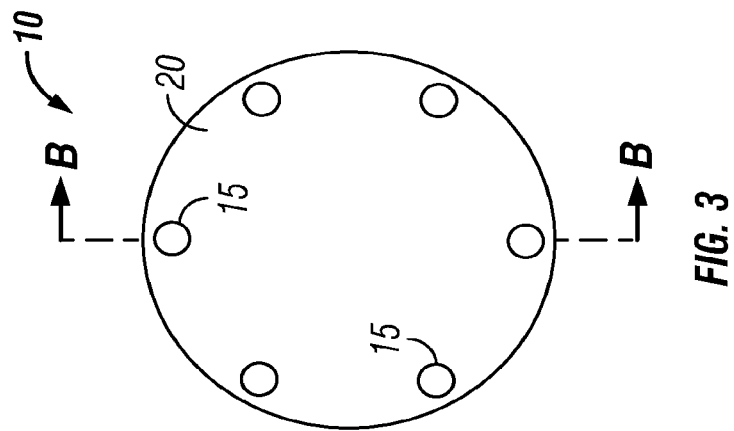
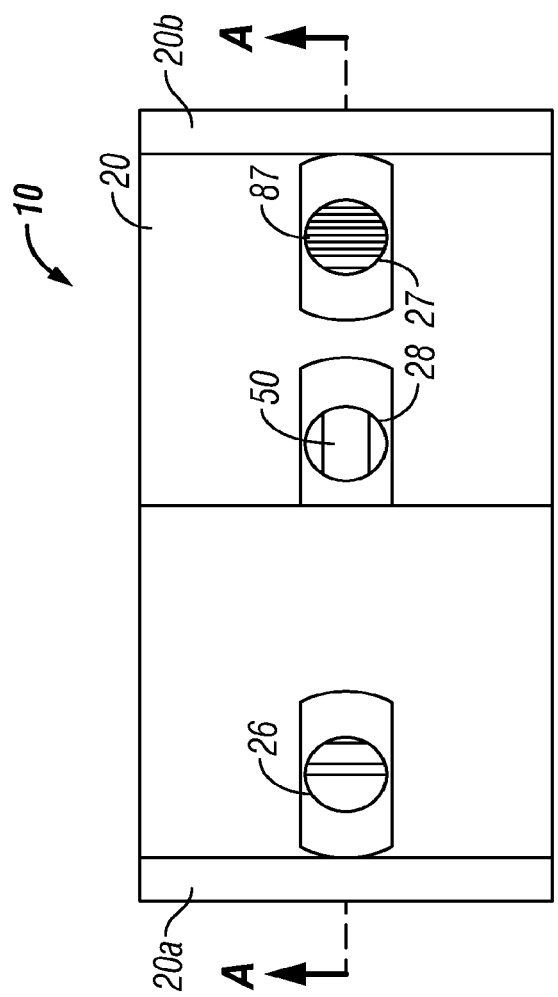

DOUBLE VALVE BLOCK AND ACTUATOR ASSEMBLY INCLUDING SAME

CROSS-REFERENCE TO RELATED APPLICATIONS

This application is a divisional of U.S. application Ser. No. 13/179,213, filed on Jul. 8, 2011, which is incorporated herein by reference in its entirety for all purposes.

BACKGROUND

1. Field of the Invention

The present invention relates generally to a double valve. More particularly, the present invention relates to a double valve that allows an unpressurized port and a balance port to be in fluid communication when a pressurized port is closed.

2. Background of the Technology

In most offshore-drilling operations, a wellhead at the sea floor is positioned at the upper end of the subterranean wellbore lined with casing, a blowout-preventer (BOP) stack is mounted to the wellhead, and a lower-marine-riser package (LMRP) is mounted to the BOP stack. The upper end of the LMRP typically includes a flex joint coupled to the lower end of a drilling riser that extends upward to a drilling vessel at the sea surface. A drill string is hung from the drilling vessel through the drilling riser, the LMRP, the BOP stack, and the wellhead into the wellbore.

During drilling operations, drilling fluid, or mud, is pumped from the sea surface down the drill string, and returns up the annulus around the drill string. In the event of a rapid invasion of formation fluid into the annulus, commonly known as a kick, the BOP stack may actuate to seal the annulus and control the fluid pressure in the wellbore. In particular, the BOP stack typically includes a plurality of stacked sets of opposed rams (e.g., pipe rams, shear rams, blind rams, etc.) designed to seal in the wellbore and prevent the release of high-pressure formation fluids from the wellbore and so the BOP stack and LMRP function as pressure control devices. The opposed rams are disposed in cavities that intersect the main bore of the BOP stack and support the rams as they move radially into and out of the main bore. Each set of rams is actuated and transitioned between an open position and a closed position by a pair of actuators. In the open positions, the rams are radially withdrawn from the main bore and do not interfere with hardware that may extend through the main bore. However, in the closed positions, the rams are radially advanced into the main bore to close off and seal the wellbore.

Each ram actuator hydraulically moves a piston within a cylinder to move a drive rod coupled to one of the rams. In particular, pressurized hydraulic fluid is supplied to a first chamber within the cylinder on one side of the piston to move the piston in a first direction and close the corresponding ram; and pressurized hydraulic fluid is supplied to a second chamber within the cylinder on the opposite side of the piston to move the piston in the opposite direction and open the corresponding ram. For relatively deepwater subsea BOP stacks, supplying a sufficient volume and pressure of hydraulic fluid from the surface to actuate a ram may be challenging. Consequently, in many cases, subsea-hydraulic accumulators are employed to supply pressurized hydraulic fluid to the ram actuators. The accumulators may be charged with a finite volume of pressurized fluid at the surface prior to being deployed subsea or after being deployed subsea. The pressure of the charged fluid in the accumulators required to actuate the rams depends on a variety of factors—such as the depth of the BOP stack—and must be carefully controlled to ensure proper operation of the rams. Since subsea accumulators provide a finite and limited volume of pressurized hydraulic fluid (between charges), it is generally desirable to conserve pressurized hydraulic fluid volume within subsea accumulators.

Typically, the force required to close a ram is substantially greater than the force to open the ram. However, with a simple piston-cylinder assembly, the same volume of pressurized hydraulic fluid is required to open as well as close the ram. Thus, opening the ram consumes more pressurized hydraulic fluid volume than is necessary and wastes the finite volume of pressurized hydraulic fluid in the subsea accumulators.

Accordingly, there remains a need in the art for devices, systems, and methods for actuating one or more rams of a subsea BOP stack. Such devices, systems, and methods would be particularly well-received if they offered the potential to reduce the volume of pressurized hydraulic fluid necessary to open the rams.

BRIEF SUMMARY OF THE DISCLOSURE

These and other needs in the art are addressed in one embodiment by a valve for controlling the flow of a fluid. In an embodiment, the valve comprises a housing having a longitudinal axis and including a first chamber, a second chamber, and a neutral chamber positioned axially between the first chamber and the second chamber. In addition, the valve comprises an elongate stem slidingly disposed within the housing and extending axially through the neutral chamber. The stem includes a first end and a second end opposite the first end. Further, the valve comprises a first valve member at least partially disposed in the first chamber and connected to the first end of the stem. The first valve member has a closed position seated in a first annular valve seat positioned axially between the first chamber and the neutral chamber and an open position spaced apart from the first valve seat. Still further, the valve includes a second valve member at least partially disposed in the second chamber and connected to the second end of the stem. The second valve member has a closed position seated in a second annular valve seat positioned axially between the second chamber and the neutral chamber and an open position spaced apart from the second valve seat. Moreover, the valve includes a biasing member positioned between the second valve member and the housing. The biasing member is configured to bias the second valve member to the closed position and the first valve member to the open position.

These and other needs in the art are addressed in another embodiment by a system for drilling a subsea wellbore. In an embodiment, the system comprises a BOP including a main bore and a ram BOP. The ram BOP includes a pair of opposed rams, each ram having an open position withdrawn from the main bore and a closed position extending into the main bore. In addition, the system comprises an actuator assembly configured to transition one ram between the open position and the closed position. The actuator assembly comprises a cylinder having an inner cavity. Further, the actuator assembly comprises a piston slidingly disposed in the cylinder. The piston divides the inner cavity of the cylinder into a close chamber, an open chamber, and a neutral chamber positioned between the open chamber and the closed chamber. Still further, the actuator assembly comprises a connecting rod coupled to the piston and the ram. The actuator assembly also comprises a valve including a housing having a longitudinal axis and including a close chamber, a open chamber, and an neutral chamber positioned axially between the first chamber and the second chamber. The close chamber is in fluid communication with the close chamber, the open chamber is in fluid communication with the open chamber, and the neutral chamber is in fluid communication with the neutral chamber. In addition, the valve comprises a first valve member at least partially disposed in the close chamber and having an open position allowing fluid communication between the close chamber and the neutral chamber and a closed position preventing fluid communication between the close chamber and the neutral chamber. Further, the valve comprises a first valve member at least partially disposed in the open chamber and having an open position allowing fluid communication between the open chamber and the neutral chamber and a closed position preventing fluid communication between the open chamber and the neutral chamber.

These and other needs in the art are addressed in another embodiment by a method for actuating a device between a first position and a second position. In an embodiment, the method comprises supplying pressurized fluid through a first fluid circuit to a first chamber of a piston-cylinder assembly and a first chamber of a valve. In addition, the method comprises exhausting fluid in a second chamber of the piston-cylinder assembly into a second fluid circuit while supplying pressurized fluid through the first fluid circuit. Further, the method comprises exhausting fluid in a second chamber of the valve into the second fluid circuit while supplying pressurized fluid through the first fluid circuit. Still further, the method comprises exhausting fluid in a third chamber of the piston-cylinder assembly into a third chamber of the valve while supplying pressurized fluid through the first fluid circuit. Moreover, the method comprises exhausting fluid in the third chamber of the valve into the second chamber of the valve while supplying pressurized fluid through the first fluid circuit.

Embodiments described herein comprise a combination of features and advantages intended to address various shortcomings associated with certain prior devices, systems, and methods. The various characteristics described above, as well as other features, will be apparent to those skilled in the art upon reading the following detailed description and by referring to the accompanying drawings.

BRIEF DESCRIPTION OF THE DRAWINGS

For a detailed description of the preferred embodiments of the invention, reference will now be made to the accompanying drawings in which:

FIG. 2 is a top view of the valve of FIG. 1;

FIG. 3 is an end view of the valve of FIG. 1;

DETAILED DESCRIPTION OF EMBODIMENTS

Figure 1:
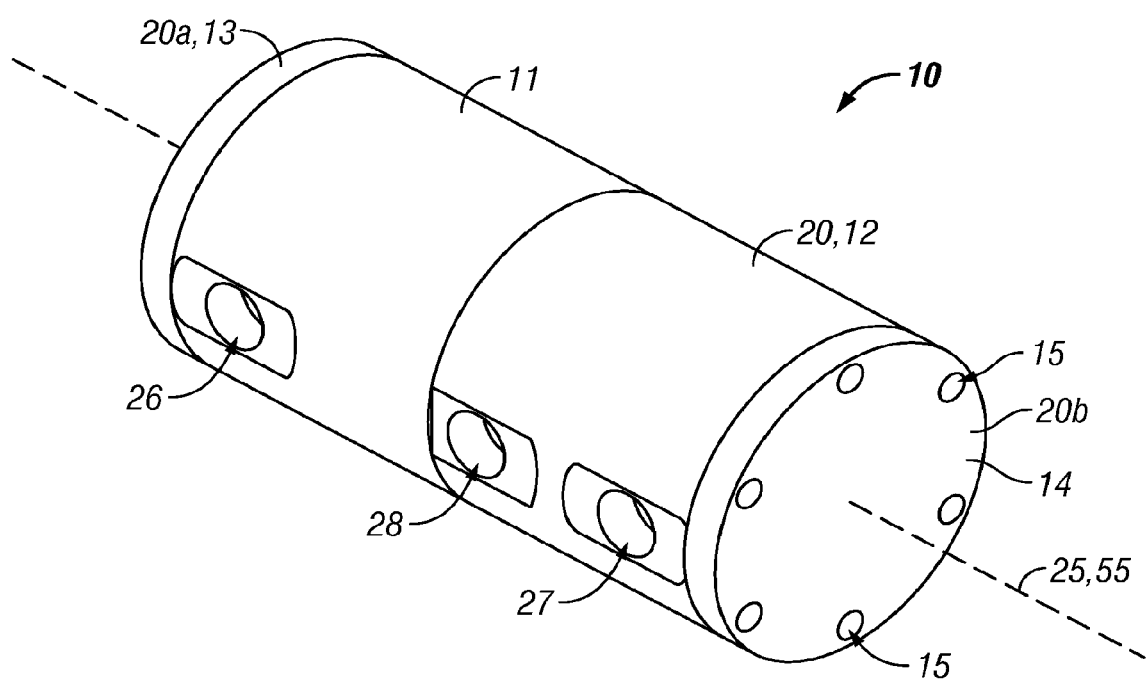
FIG. 1 is a perspective view of an embodiment of a valve in accordance with the principles described herein.
Figure 4:
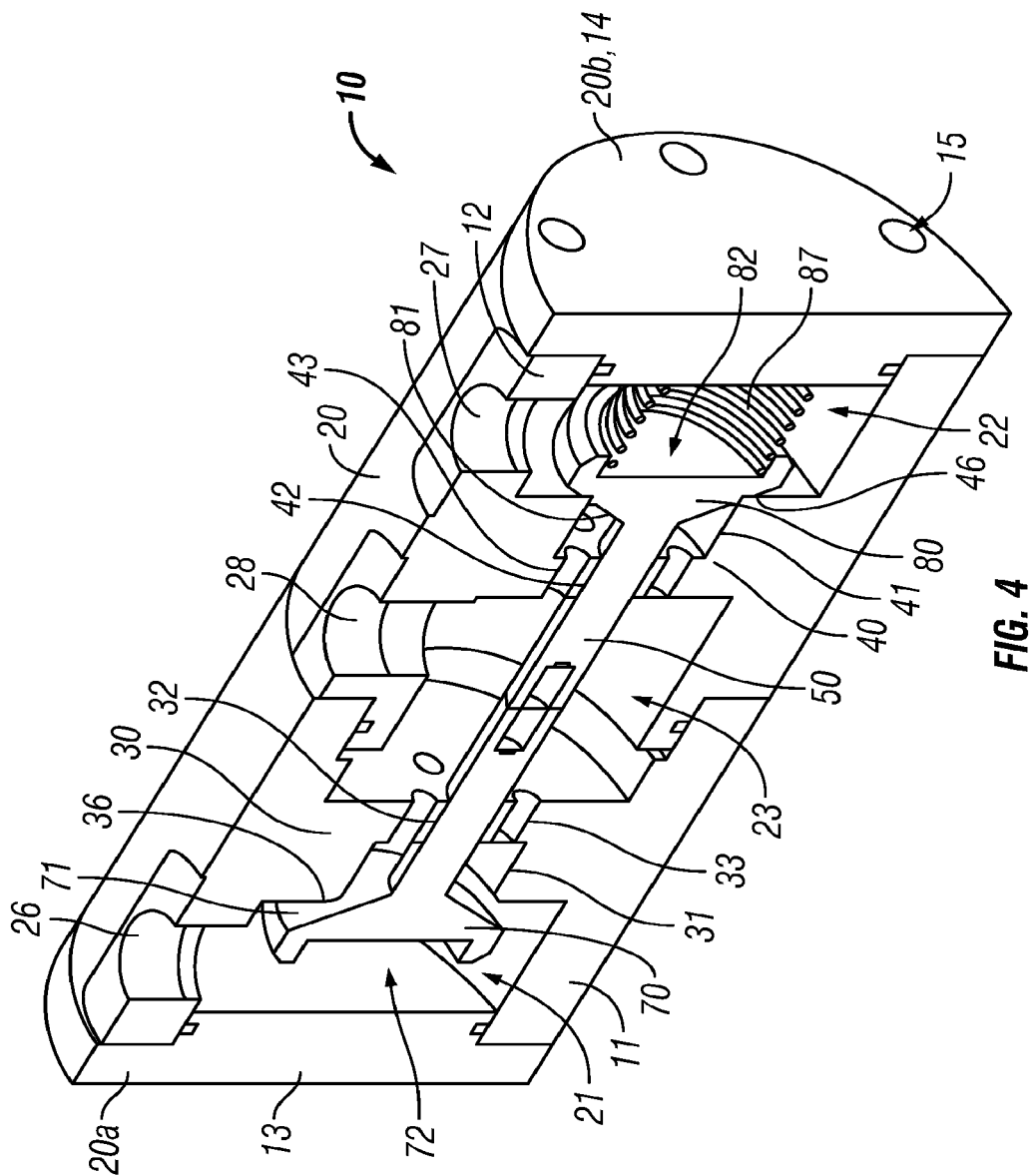
FIG. 4 is a perspective cross-sectional view of the valve of FIG. 1 taken along line A-A of FIG. 2.

The following discussion is directed to various exemplary embodiments. However, one skilled in the art will understand that the examples disclosed herein have a broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art appreciates, different persons may refer to the same feature or component by different names. This document does not intend to distinguish between components or features that differ in name but not function. The drawing figures are not necessarily to scale. Certain features and components may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Referring now to FIGS. 1-7, an embodiment of a valve 10 in accordance with the principles described herein. In general, valve 10 is designed and configured to control the flow of pressurized fluid (e.g., pressurized hydraulic fluid) used to transition or actuate a device such as a BOP ram or wedgelock between two different positions (e.g., open and closed positions). In this embodiment, valve 10 includes a valve body or housing 20, a valve stem 50 slidingly disposed in housing 20, a first valve member 70 connected to one end of stem 50, and a second valve member 80 connected to the opposite end of stem 50.

Figure 5:
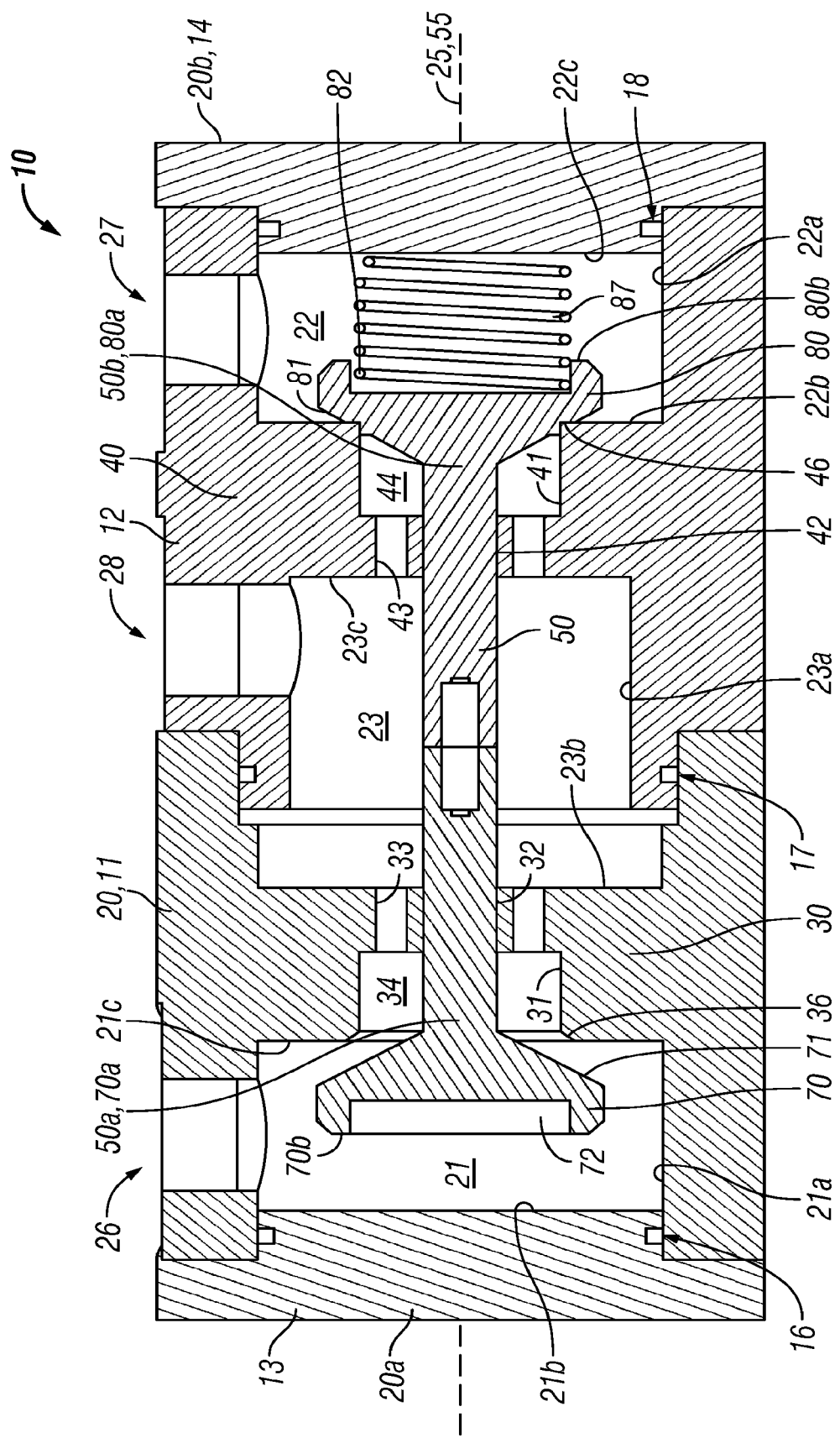
FIG. 5 is a cross-sectional side view of the valve of FIG. 1 taken along line A-A of FIG. 2 and in a close position.
Figure 6:
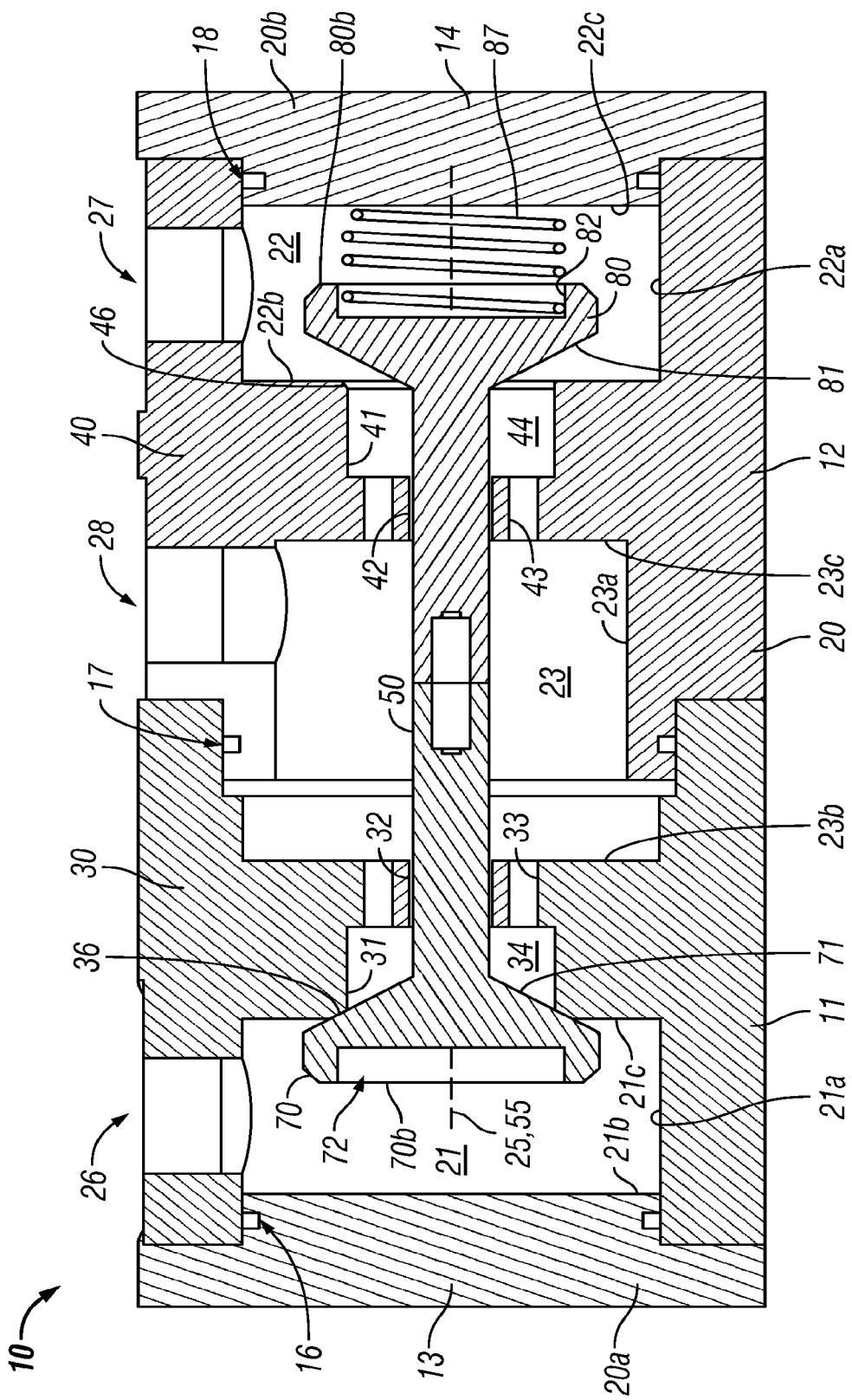
FIG. 6 is a cross-sectional side view of the valve of FIG. 1 taken along line A-A of FIG. 2 and in an open position.

Housing 20 has a central or longitudinal axis 25, a first end 20a, and a second end 20b opposite end 20a. In addition, housing 20 includes three coaxially-aligned, axially-spaced internal cavities or chambers—a close chamber 21, an open chamber 22, and a neutral chamber 23 axially disposed between chambers 21, 22. As best shown in FIGS. 5 and 6, in this embodiment, each chamber 21, 22, 23 is defined by a radially outer cylindrical surface 21a, 22a, 23a, respectively, and planar end surfaces 21b, c; 22b, c; 23b, c, respectively. Surfaces 21a, 22a, 23a are each oriented generally parallel to axis 25, and surfaces 21b, c; 22b, c; 23b, c are each oriented generally perpendicular to axis 25. A close port 26 extends radially through housing 20 to close chamber 21, an open port 27 extends radially through housing 20 to open chamber 22, and a neutral port 28 extends radially through housing 20 to neutral chamber 23.

Referring now to FIGS. 4-7, a first annular divider or wall 30 is axially positioned between and physically separates chambers 21, 23, and a second annular divider or wall 40 is axially positioned between and physically separates chambers 22, 23. In particular, wall 30 extends radially inward relative to surfaces 21a, 23a and defines planar surfaces 21c, 23b; and wall 40 extends radially inward relative to surfaces 22a, 23a and defines surfaces 22b, 23c. In addition, wall 30 includes a cylindrical recess or counterbore 31 extending axially from surface 21c, a central hole or bore 32 extending axially from recess 31 to surface 23b, and a plurality of circumferentially spaced holes or bores 33 extending axially from recess 31 to surface 23b. Counterbore 31 and central bore 32 are coaxially aligned within housing 20, and bores 33 are disposed about central bore 32. Stem 50 extends axially through counterbore 31 and central bore 32. The diameter of central bore 32 is substantially the same or slightly greater than the diameter of stem 50, and thus, stem 50 slidingly engages central bore 32. However, counterbore 31 has a diameter greater than the outer diameter of stem 50, and thus, an annulus 34 is formed within counterbore 31 radially between stem 50 and wall 30. Bores 33 extend from annulus 34 to chamber 23, thereby allowing fluid communication between annulus 34 and chamber 23.

An annular shoulder 36 is formed at the intersection of chamber 21 and counterbore 31. In this embodiment, shoulder 36 comprises a frusto-conical surface oriented at an acute angle relative to axis 25. As will be described in more detail below, valve member 70 moves into and out of sealing engagement with frusto-conical shoulder 36, and thus, shoulder 36 may also be referred to as a valve seat. When valve member 70 is seated in valve seat 36, valve member 70 restricts or prevents fluid communication between chambers 21, 23 via annulus 34 and bores 33, however, when valve member 70 is not seated against valve seat 36, fluid communication between chambers 21, 23 is permitted via annulus 34 and bores 33. Thus, annulus 34 and bores 33 provide a fluid passage between chambers 21, 23 when valve member 70 is spaced from valve seat 36.

Referring now to FIGS. 4-7, wall 40 includes a cylindrical recess or counterbore 41 extending axially from surface 22b, a central hole or bore 42 extending axially from recess 41 to surface 23c, and a plurality of circumferentially spaced holes or bores 43 extending axially from recess 41 to surface 23c. Counterbore 41 and central bore 42 are coaxially aligned within housing 20, and bores 43 are disposed about central bore 42. Stem 50 extends axially through counterbore 41 and central bore 42. The diameter of central bore 42 is substantially the same or slightly greater than the diameter of stem 50, and thus, stem 50 slidingly engages central bore 42. However, counterbore 41 has a diameter greater than the outer diameter of stem 50, and thus, an annulus 44 is formed within counterbore 41 radially between stem 50 and wall 40. Bores 43 extend from annulus 44 to chamber 23, thereby allowing fluid communication between annulus 44 and chamber 23.

An annular shoulder 46 is formed at the intersection of chamber 22 and counterbore 41. In this embodiment, shoulder 46 comprises a frusto-conical surface oriented at an acute angle relative to axis 25. As will be described in more detail below, valve member 80 moves into and out of sealing engagement with frusto-conical shoulder 46, and thus, shoulder 46 may also be referred to as a valve seat. When valve member 80 is seated in valve seat 46, valve member 80 restricts or prevents fluid communication between chambers 22, 23 via annulus 44 and bores 43, however, when valve member 80 is not seated against valve seat 46, fluid communication between chambers 22, 23 is permitted via annulus 44 and bores 43. Thus, annulus 44 and bores 43 provide a fluid passage between chambers 22, 23 when valve member 80 is spaced from valve seat 46.

Figure 7:
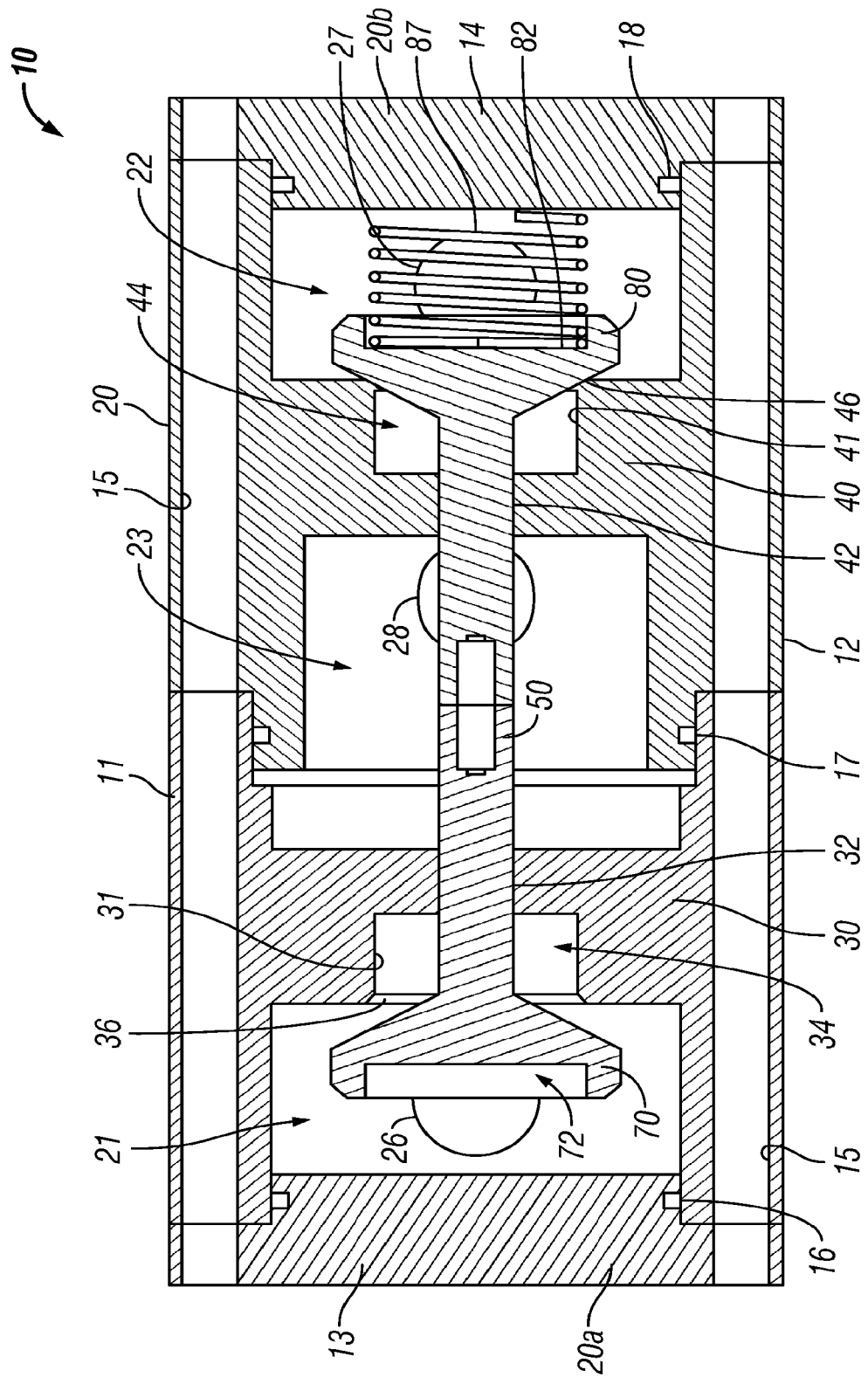
FIG. 7 is a cross-sectional side view of the valve of FIG. 1 taken along line B-B of FIG. 3.

Referring again to FIGS. 1-7, in this embodiment, housing 20 is formed by a first valve block 11, a second valve block 12, a first end cap 13, and a second end cap 14 coaxially aligned and axially coupled end-to-end. End cap 13 and block 11 define close chamber 21; blocks 11, 12 define neutral chamber 23; and end cap 14 and block 12 define open chamber 22. As best shown in FIGS. 1, 3, and 7, a plurality of circumferentially-spaced throughbores 15 extend axially through each block 11, 12 and cap 13, 14 between ends 20a, b. Bolts (not shown) are passed through bores 15 to axially compress housing 20 and hold blocks 11, 12 and end caps 13, 14 together. An annular seal assembly 16 is radially disposed between and sealingly engages end cap 13 and block 11, an annular seal assembly 17 is radially disposed between and sealingly engages blocks 11, 12, and an annular seal assembly 18 is radially disposed between and sealingly engages end cap 14 and block 12. In this embodiment, each seal assembly 16, 17, 18 comprises an annular recess or seal gland and an O-ring seal disposed in the seal gland. Seal assemblies 16, 17, 18 restrict or prevent fluid communication through the joints formed between blocks 11, 12 and end caps 13, 14.

Referring now to FIGS. 4-7, stem 50 is an cylindrical rod coaxially disposed in housing 20. As previously described, stem 50 extends through and slidingly engages central bores 33, 43 in walls 30, 40, respectively. In addition, stem 50 has a central or longitudinal axis 55 coincident with axis 25, a first end 50a proximal to close chamber 21, and a second end 50b opposite end 50a and proximal to open chamber 22. In this embodiment, stem 50 is made from two separate elongate stems that are connected end-to-end with a threaded stud.

Ends 50a, b are secured to valve members 70, 80, respectively. In this embodiment, valve members 70, 80 are integral and monolithically formed with respective ends 50a, b. Each valve member 70, 80 is an annular disc coaxially aligned with stem 50. In particular, each valve member 70, 80 has an inner end 70a, 80a, respectively, integral with end 50a, b, respectively, and an outer end 70b, 80b, respectively, integral with distal end 50a, b, respectively. In addition, each valve member 70, 80 comprises a frustoconical surface 71, 81, respectively, extending from inner end 70a, 80a, respectively. Surfaces 71, 81 are oriented at an acute angle relative to axes 25, 55, and more specifically, are oriented at the same angle as valve seat 36, 46, respectively. Thus, surfaces 71, 81 of valve members 70, 80, respectively, are configured to mate with valve seats 36, 46, respectively. Each valve member 70, 80 also includes a cylindrical recess or counterbore 72, 82, respectively, extending axially from outer end 70b, 80b, respectively.

Valve member 70 releasably engages mating valve seat 36 to control fluid communication between close chamber 21 and neutral chamber 23, and valve member 80 releasably engages mating valve seat 46 to control fluid communication between open chamber 22 and neutral chamber 23. Frustoconical surface 71 of valve member 70 mates with seat 36, thereby forming an annular metal-to-metal seal 74 therebetween when valve member 70 engages seat 36. Likewise, frustoconical surface 81 of valve member 80 mates with seat 46, thereby forming an annular metal-to-metal seal 84 therebetween when valve member 80 engages seat 46. Seal 74 restricts and/or prevents fluid communication between close chamber 21 and annulus 34 when valve member 70 is seated in seat 36, and seal 84 restricts and/or prevents fluid communication between open chamber 22 and annulus 44 when valve member 80 is seated in seat 46. Accordingly, each valve member 70, 80 may be described as having a closed position engaging seat 36, 46, respectively, and an open position axially spaced from seat 36, 46, respectively.

Stem 50 moves axially within housing 20 to move valve members 70, 80 into and out of sealing engagement with mating seats 36, 46, respectively (i.e., between the open and closed positions). In other words, valve members 70, 80 move axially relative to housing 20 along with stem 50. In particular, stem 50 has an axial length such that when valve member 80 is in the closed position sealingly engaging seat 46, valve member 70 is in the open position axially spaced from seat 36 (FIG. 5); and when valve member 70 is in the closed position sealingly engaging seat 36, valve member 80 is in the open position axially spaced from seat 46 (FIG. 6). Thus, when fluid communication between chambers 22, 23 is restricted and/or prevented by seal 84 between valve member 80 and seat 46, fluid communication between chambers 21, 23 is permitted (FIG. 5); and when fluid communication between chambers 21, 23 is restricted and/or prevented by seal 74 between valve member 70 and seat 36, fluid communication between chambers 22, 23 is permitted (FIG. 6). It should be appreciated that one valve member 70, 80 is open when the other valve member 70, 80 is closed, and further, neutral chamber 23 is in fluid communication with chamber 21 or chamber 22 depending on which valve member 70, 80 is open.

Valve member 80 is biased to the closed position engaging seat 46 by a biasing member 87 positioned axially between valve member 80 and housing 20. Since valve member 70 is in the open position when valve member 80 is in the closed position, biasing member 87 may also be described as biasing valve member 70 to the open position. In this embodiment, biasing member 87 is a coil spring. Biasing member 87 is seated in recess 82 of valve member 80 to restrict and/or prevent biasing member 87 from moving radially within chamber 22.

Referring still to FIGS. 5 and 6, the axial positions of stem 50 and valve members 70, 80 depends on the combined effects of the biasing force applied by biasing member 87 and the fluid pressures within chambers 21, 22. As previously described, one valve member 70, 80 is open when the other valve member 70, 80 is closed, and neutral chamber 23 is in fluid communication with chamber 21 or chamber 22 depending on which valve member 70, 80 is open. Thus, the fluid pressure in neutral chamber 23 will typically be the same as the fluid pressure of the chamber 21, 22 that is in fluid communication with neutral chamber 23. The fluid pressure within each chamber 21, 22 is controlled via ports 26, 27.

When the sum of the axial forces applied to valve member 80 by biasing member 87 and fluid pressure within chamber 22 are greater than the sum of the axial forces applied to valve member 70 by fluid pressure within chamber 21 and the fluid pressure applied to valve member 80 by fluid pressure within annulus 44, valve member 80 will remain in the closed position and valve member 70 will remain in the open position. As a result, chambers 21, 23 will remain in fluid communication, and chamber 22 will not be in fluid communication with chambers 21, 23. However, when the sum of the axial forces applied to valve member 80 by biasing member 87 and fluid pressure within chamber 22 are less than the sum of the axial forces applied to valve member 70 by fluid pressure within chamber 21 and the fluid pressure applied to valve member 80 by fluid pressure within annulus 44, valve member 80 will transition to the open position and valve member 70 will transition to the closed position. As a result, chambers 22, 23 will be in fluid communication, and chamber 21 will not be in fluid communication with chambers 22, 23. Valves 70, 80 will transition back to the open and closed positions, respectively, when the sum of the axial forces applied to valve member 80 by biasing member 87 and fluid pressure within chamber 22 are greater than the sum of the axial forces applied to valve member 70 by fluid pressure within chamber 21 and the fluid pressure applied to valve member 80 by fluid pressure within annulus 44. The biasing force applied by biasing member 87 is predetermined and generally constant, and thus, by varying the fluid pressure differential between chambers 21, 22, valve members 70, 80 may be transitioned between the open and closed positions.

Valve 10 is particular designed and suited to control the flow of pressurized fluid (e.g., pressurized hydraulic fluid) used to transition or actuate a device or component (e.g., BOP rams or wedgelocks) between two different positions (e.g., open and closed positions, locked and unlocked, first position and second position, etc.). In such applications, valve 10 offers the potential to more efficiently utilize stored fluid pressure and reduce reliance on hydraulic accumulators as compared to conventional hydraulically actuated devices.

Figure 8:
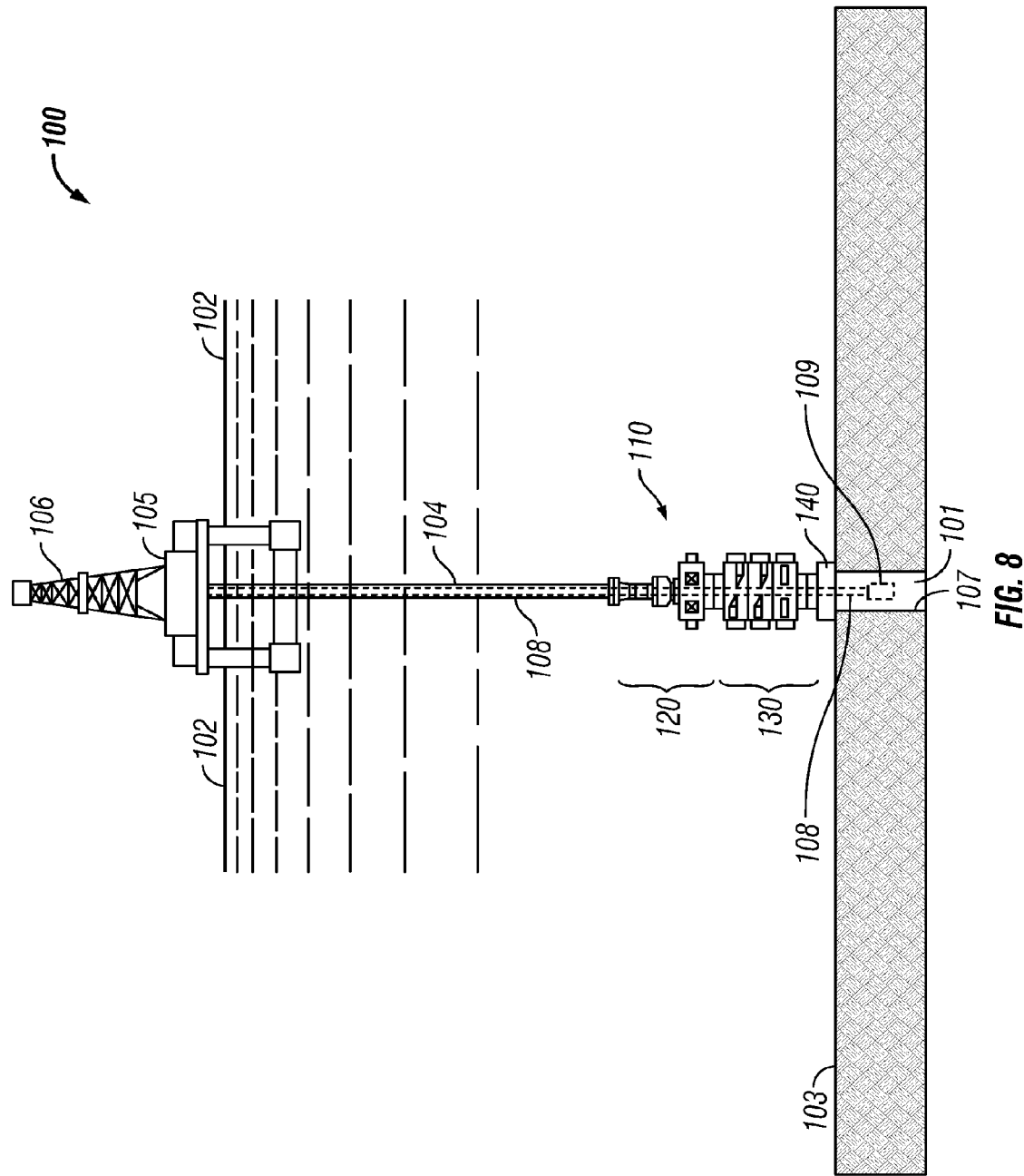
FIG. 8 is a schematic view of an offshore drilling and/or production system including a subsea BOP stack.

Referring now to FIG. 8, an embodiment of an offshore system 100 for drilling and producing a wellbore 101 is shown. In this embodiment, system 100 includes an offshore vessel or platform 105 at the sea surface 102 and a subsea-BOP-stack assembly 110 mounted to a wellhead 140 at the sea floor 103. Platform 105 is equipped with a derrick 106 that supports a hoist (not shown). A tubular drilling riser 104 extends from platform 105 to BOP stack assembly 110. Riser 104 returns drilling fluid or mud to platform 105 during drilling operations. Casing 107 extends from wellhead 140 into subterranean wellbore 101.

Downhole operations are carried out by a tubular string 108 (e.g., drillstring, production tubing string, coiled tubing, etc.) that is supported by derrick 106 and extends from platform 105 through riser 104, through the BOP-stack assembly 110, and into the wellbore 101. A downhole tool 109 is connected to the lower end of tubular string 108. In general, downhole tool 109 may comprise any suitable downhole tool(s) for drilling, completing, evaluating, or producing wellbore 101 including, without limitation, drill bits, packers, testing equipment, perforating guns, and the like. During downhole operations, string 108, and tool 109 coupled thereto, may move axially, radially, or rotationally relative to riser 104 and BOP stack assembly 110.

Figure 9:
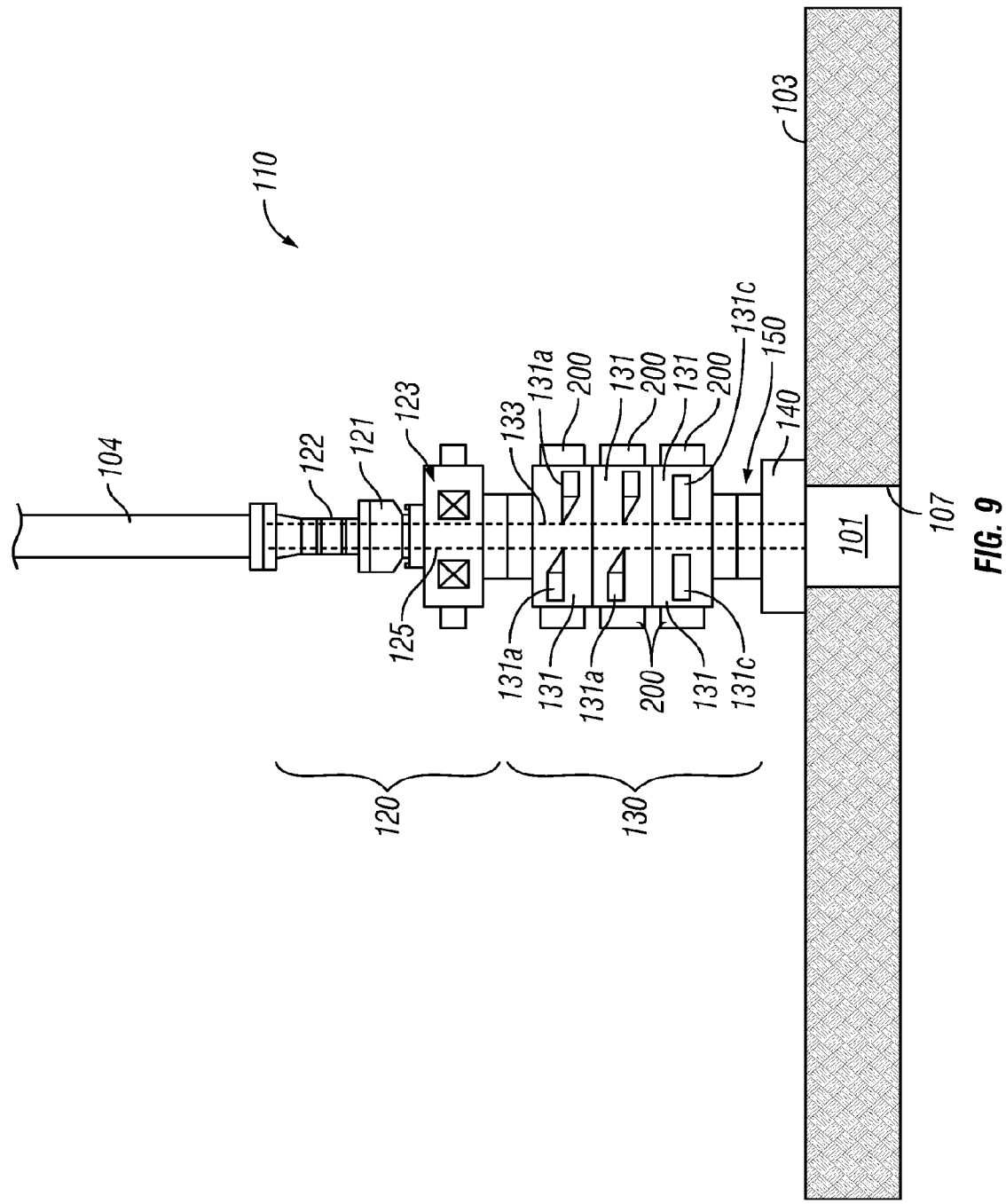
FIG. 9 is an enlarged schematic view of the BOP stack of FIG. 8.

Referring now to FIGS. 8 and 9, BOP stack assembly 110 is mounted to wellhead 140 and is designed and configured to control and seal wellbore 101, thereby containing the hydrocarbon fluids therein. In this embodiment, BOP stack assembly 110 comprises an LMRP 120 and a BOP stack 130. BOP stack 130 is mounted to wellhead 140, and LMRP 120 is secured to the upper end of BOP stack 130 and the lower end of riser 104. In this embodiment, the connections between wellhead 140, BOP stack 130, and LMRP 120 comprise mechanical wellhead-type connections 150. In general, connections 150 may comprise any suitable releasable wellhead-type mechanical connection such as the H-4® profile subsea system available from VetcoGray Inc. of Houston, Tex. and the DWHC profile subsea system available from Cameron International Corporation of Houston, Tex. Typically, such hydraulically actuated, mechanical wellhead-type connections (e.g., connections 150) comprise an upward-facing male connector or hub that is received by and releasably engages a downward-facing mating female connector or receptacle.

Referring still to FIGS. 8 and 9, LMRP 120 comprises a riser flex joint 121, a riser adapter 122, and an annular BOP 123. A flow bore 125 extends through LMRP 120 from riser 104 at the upper end of LMRP 120 to connection 150 at the lower end of LMRP 120. Riser adapter 122 extends upward from flex joint 121 and is coupled to the lower end of riser 104 with a flange joint. Flex joint 121 allows riser adapter 122 and riser 104 connected thereto to deflect angularly relative to LMRP 120 while hydrocarbon fluids flow from wellbore 101 through BOP stack assembly 110 into riser 104. Annular BOP 123 comprises an annular elastomeric sealing element that is mechanically squeezed radially inward to seal on a tubular extending through LMRP 120 (e.g., string 108, casing, drillpipe, drill collar, etc.) or seal off bore 125. Thus, annular BOP 123 has the ability to seal on a variety of pipe sizes and seal off bore 125 when no tubular is extending therethrough.

BOP stack 130 comprises a plurality of axially-stacked ram BOPs 131. A main bore 133 extends through BOP stack 130 from LMRP 120 at the upper end of stack 130 to wellhead 140. Each ram BOP 131 includes a pair of opposed rams and a pair of actuator assemblies 200 that actuate and drive the matching rams—one actuator assembly 200 controls the position of one of the pair of opposed rams. In this embodiment, BOP stack 130 includes three ram BOPs 131: (1) an upper-ram BOP 131 including opposed blind shear rams or blades 131a for severing tubular string 108 and sealing off wellbore 101 from riser 104 (or sealing off wellbore 101 when no string or tubular extends through bore 133); (2) one intermediate-ram BOP 131 including opposed blind shear rams 131a for severing tubular string 108 and sealing off wellbore 101 from riser 104 (or sealing off wellbore 101 when no string or tubular extends through bore 133); and (3) one lower-ram BOP 131 including opposed pipe rams 131c for engaging string 108 and sealing the annulus around tubular string 108.

Opposed rams 131a, c are located in cavities that intersect main bore 133 and support rams 131a, c as they move into and out of main bore 133. Each set of rams 131a, c is actuated and transitioned between an open position and a closed position by corresponding actuator assemblies 200. In the open positions, rams 131a, c are radially withdrawn from main bore 133. However, in the closed positions, rams 131a, c are radially advanced into main bore 133 to close off and seal main bore 133 (e.g., rams 131a) or the annulus around tubular string 108 (e.g., 131c). Main bore 133 is coaxially aligned with flow bore 125 of LMRP 120, and is in fluid communication with flow bore 125 when rams 131a, c are open.

As previously described, in this embodiment, BOP stack 130 includes three sets of ram BOPs (two sets of blind-shear rams 131a and one set of pipe rams 131c). However, in other embodiments, the BOP stack (e.g., stack 130) may include different numbers of rams, different types of rams, an annular BOP (e.g., annular BOP 123), or combinations thereof. Further, although LMRP 120 is shown and described as including one annular BOP 123, in other embodiments, the LMRP (e.g., LMRP 120) may include a different number of annular BOPs (e.g., two sets of annular BOPs 123). Moreover, although BOP stack 130 may be referred to as a stack since it contains a plurality of ram BOPs 131 in this embodiment, in other embodiments, BOP stack 130 may include only one ram BOP 131.

Figure 10:
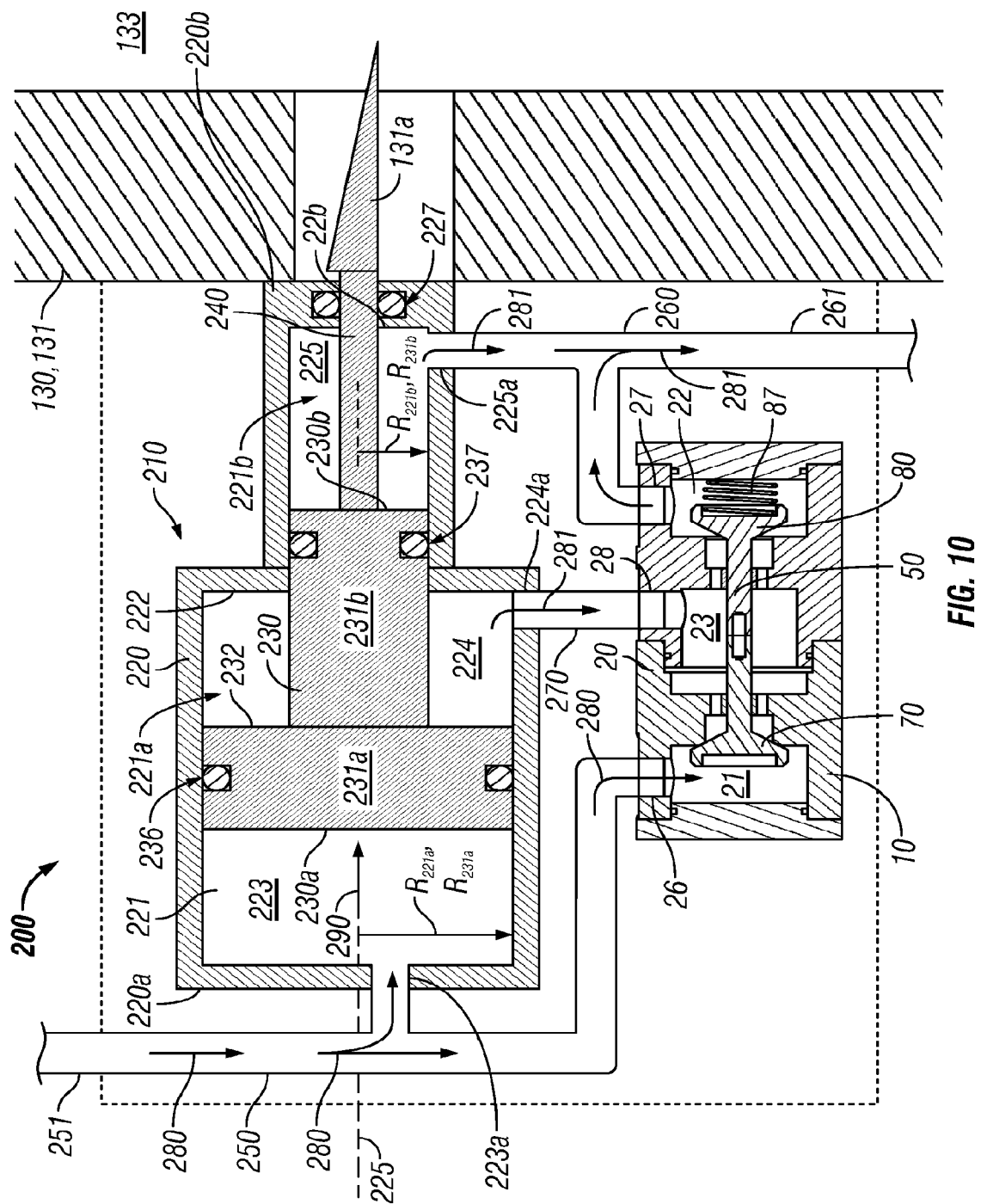
FIG. 10 is a schematic view of one ram actuator assembly of the BOP stack of FIG. 9 closing one exemplary BOP ram of FIG. 9.
Figure 11:
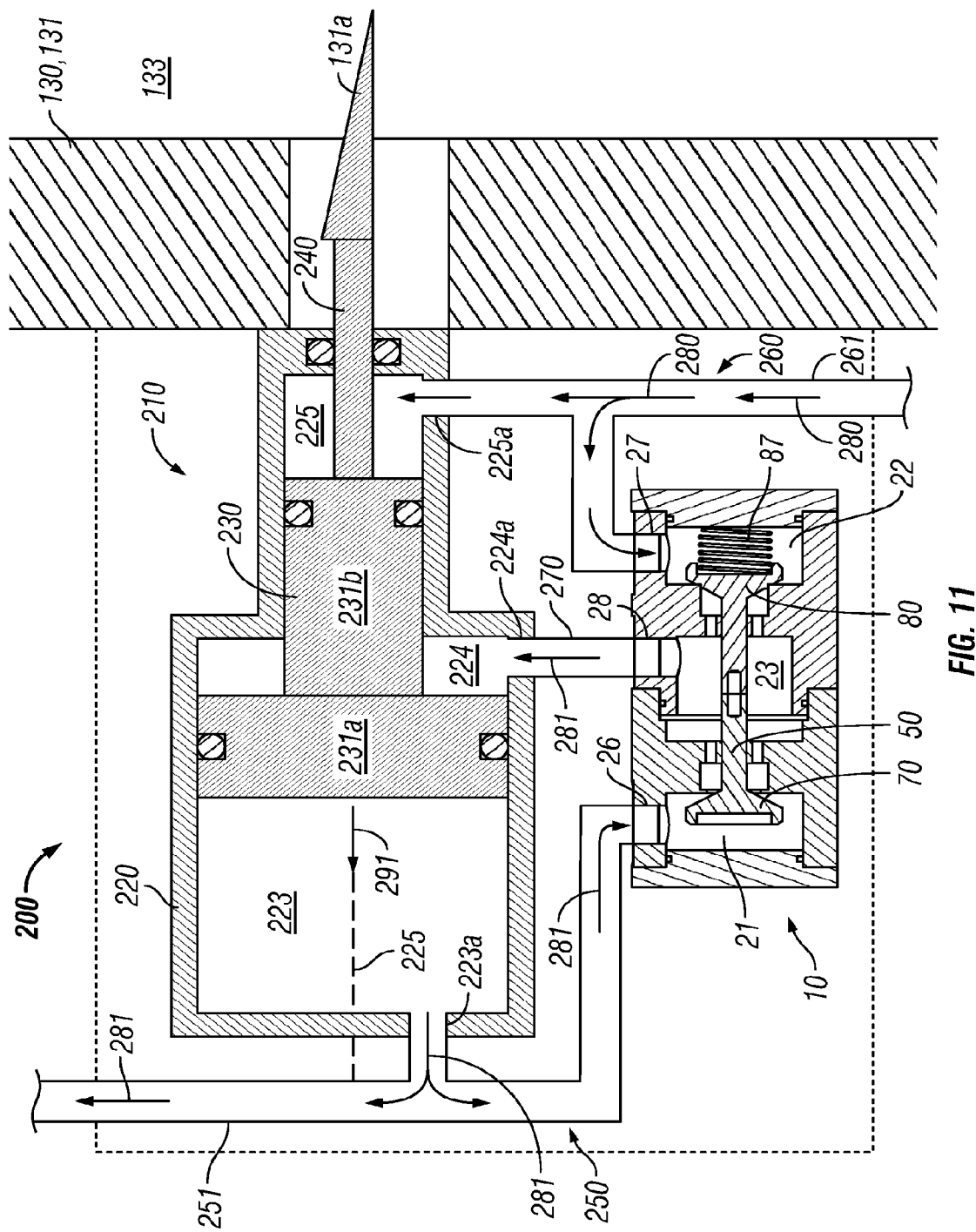
FIG. 11 is a schematic view of the ram actuator assembly of FIG. 10 opening the exemplary BOP ram of FIG. 10.

Referring now to FIGS. 10 and 11, one actuator assembly 200 of one BOP ram 131 of FIG. 9 is shown. Here, actuator assembly 200 is shown transitioning an exemplary ram 131a of a pair of opposed rams between the open and closed positions. More specifically, in FIG. 10, actuator assembly 200 is shown transitioning ram 131a from the open position radially withdrawn from main bore 133 to the closed position radially advanced into main bore 133; and in FIG. 11, actuator assembly 200 is shown transitioning ram 131a from the closed position radially advanced into main bore 133 to the open position radially withdrawn from main bore 133. Although actuator assembly 200 is shown transitioning an exemplary shear ram 131a, in general, actuator assembly 200 may be employed to actuate any type of ram (e.g., shear blind ram 131a, pipe ram 131c, etc.) or any type of device between two different positions. For example, actuator assembly 200 shown in FIGS. 10 and 11 is employed with each of the rams 131a, 131c shown in FIG. 9.

In this embodiment, actuator assembly 200 includes a piston-cylinder assembly 210 and valve 10 previously described. Piston-cylinder assembly 210 includes a housing or cylinder 220 and a piston 230 slidingly disposed in cylinder 220. Cylinder 220 has a central axis 225, a first end 220a distal main bore 133, a second end 220b opposite end 220a and proximal main bore 133, and an inner chamber or cavity 221 extending axially between ends 220a, b. In this embodiment, an annular planar shoulder 222 divides cavity 221 into a first or increased diameter section 221a extending axially from end 220a to shoulder 222 and a second or reduced diameter section 221b extending axially from end 220b to shoulder 222. First section 221a of cavity 221 has a uniform radius $R_{221a}$, and second section 221b of cavity 221 has a uniform radius $R_{221b}$ that is less than radius $R_{221a}$.

Piston 230 is coaxially disposed within cylinder 220 and has a first end 230a distal main bore 133 and a second end 230b opposite end 230a and proximal main bore 133. In this embodiment, an annular planar shoulder 232 divides piston 230 into a first or increased diameter section 231a extending axially from end 230a to shoulder 232 and a second or decreased diameter section 231b extending axially from end 230b to shoulder 232. First section 231a of piston 230 has a uniform radius $R_{231a}$, and second section 231b of piston 230 has a uniform radius $R_{231b}$ that is less than radius $R_{221a}$. In addition, radius $R_{231a}$ is substantially the same or slightly less than radius $R_{221a}$, and thus, first section 231a of piston 230 slidingly engages cylinder 220 within first section 221a of cavity 221; and radius $R_{231b}$ is substantially the same or slightly less than radius $R_{221b}$, and thus, second section 231b of piston 230 slidingly engages cylinder 220 within second section 221b of cavity 221. It should be appreciated that radius $R_{231a}$ is greater than radius $R_{221b}$, and thus, first section 231a of piston 230 does not fit within second section 221b of cavity 221; and further, radius $R_{231b}$ is less than radius $R_{221a}$, and thus, second section 231b of piston 230 can fit within first section 221a of cavity 221 but does not slidingly engage cylinder 220 within first section 221a.

Referring still to FIGS. 10 and 11, piston 230 divides cavity 221 of cylinder 220 into three volumes or chambers: (1) a first chamber 223 extending axially from end 220a to section 231a of piston 230; (2) a second chamber 224 extending axially from section 231a of piston 230 to shoulder 222; and (3) a third chamber 225 extending axially from end 220b to section 231b of piston 230. Chamber 225 is an annulus radially positioned between second section 231b of piston 230 and cylinder 220.

Chambers 223, 224, 225 are sealed from one another within piston-cylinder assembly 210. More specifically, in this embodiment, a first annular seal assembly 236 is radially disposed between section 231a of piston 230 and cylinder 220, and a second annular seal assembly 237 is radially positioned between section 231b of piston 230 and cylinder 220. Each seal assembly 236, 237 includes an annular gland in section 231a, 231b, respectively, of piston 230 and an annular-seal member disposed in gland 236a, 237a, respectively. Each seal member forms a static seal with piston 230 within its corresponding gland and a dynamic seal with cylinder 220. Accordingly, seal assembly 236 restricts or prevents fluid communication between chambers 223, 224, and seal assembly 237 restricts or prevents fluid communication between chambers 224, 225.

As will be described in more detail below, ram 131a is transitioned to the closed position by increasing the fluid pressure in first chamber 223 relative to the fluid pressure in chambers 224, 225, and ram 131a is transitioned to the open position by increasing the fluid pressure in third chamber 225 relative to the fluid pressure in chambers 223, 224. Thus, first chamber 223 may also be referred to as the close chamber, and third chamber 225 may also be referred to as the open chamber. Further, since chamber 224 is in fluid communication with neutral chamber 23 of valve 10, it may also be referred to as a neutral chamber. A first port 223a extends through cylinder 220 and is in fluid communication with close chamber 223, a second port 224a extends through cylinder 220 and is in fluid communication with chamber 224, and a third port 225a extends through cylinder 220 and is in fluid communication with open chamber 225.

Second end 230b of piston 230 is coupled to ram 131a with an elongate connecting rod 240 that extends axially through end 220b of cylinder 220. In particular, rod 240 slidingly engages a throughbore 226 in end 220b of cylinder 220. Ram 131a is fixed to one end of rod 240 and second section 231b of piston 230 is fixed to the opposite end of rod 240. Thus, rod 240 and ram 131a do not move rotationally or translationally relative to piston 230, and ram 131a moves axially along with piston 230.

An annular-seal assembly 227 is radially disposed between rod 240 and cylinder 220 along through bore 226. Seal assembly 227 includes an annular recess or gland and an annular seal member disposed in the gland. The seal member forms a static seal with cylinder 220 and a dynamic seal with rod 240. Accordingly, seal assembly 227 restricts or prevents fluid flow through bore 226 between rod 240 and cylinder 220.

Referring still to FIGS. 10 and 11, a first fluid circuit 250 includes a fluid supply/exhaust line 251 coupled to port 223a and port 26. Thus, fluid line 251 is in fluid communication with both close chamber 223 of piston-cylinder assembly 210 via port 223a and chamber 21 of valve 10 via port 26. Similarly, a second fluid circuit 260 includes a fluid supply/exhaust line 261 coupled to port 225a and port 27. Thus, fluid supply/exhaust line 261 is in fluid communication with chamber 225 of piston-cylinder assembly 210 via port 225a and chamber 22 of valve 10 via port 27. Still further, a fluid line 270 has one end coupled to port 224a and the opposite end coupled to port 28. Thus, fluid line 270 is in fluid communication with chamber 224 of piston-cylinder assembly 210 via port 224a and chamber 23 of valve 10 via port 28. In general, fluid (e.g., hydraulic fluid) may be supplied to or exhausted from chambers 21, 223 simultaneously via first fluid circuit 250, and fluid may be supplied to or taken from chambers 22, 225 simultaneously via second fluid circuit 260. Fluid line 270 simply allows fluid to flow between chambers 23, 224.

Referring now to FIG. 10, to move ram 131a radially inward relative to bore 133 (i.e., transition ram 131a to the closed position), pressurized fluid represented by arrows 280 (e.g., pressurized hydraulic fluid) is simultaneously supplied to close chamber 21 of valve 10 and close chamber 223 of piston-cylinder assembly 210 via first fluid circuit 250. In general, pressurized fluid 280 may be supplied to circuit 250 by any suitable source including, without limitation, a pump or fluid accumulators. In this embodiment, pressurized fluid 280 is supplied to circuit 250 by one or more subsea hydraulic fluid accumulators connected to line 251 or from vessel 105 via one or more hydraulic lines extending subsea to line 251. Pressurized fluid 280 in chamber 223 of piston-cylinder assembly 210 begins to force piston 230 in a first axial direction 290 through cylinder 220 (to the right in FIG. 10). In addition, pressurized fluid 280 in chamber 21 of valve 10 transitions valve member 70 from the biased open position to the closed position, thereby transitioning valve member 80 from the biased closed position to the open position. Prior to closing valve member 70 and opening valve member 80, chamber 21 of valve 10 is in fluid communication with chamber 23 via annulus 34 and bores 33, and chamber 23 of valve 10 is in fluid communication with chamber 224 of piston-cylinder assembly 210 via line 270. Thus, the fluid pressure in chamber 224 is substantially the same as the fluid pressure in chamber 223, and resists the axial movement of piston 230 through cylinder 220 in first axial direction 290, thereby hydraulically locking piston 230. However, once valve member 70 is closed and valve member 80 is open, piston 230 is no longer hydraulically locked since chambers 23, 224 are no longer in fluid communication with first fluid circuit 250 and chamber 21; instead, chambers 23, 224 are in fluid communication with chamber 22 of valve 10 via bores 43 and annulus 44 and circuit 260 via port 27. Thus, as piston 230 is moved axially in first direction 290 by fluid pressure within chamber 223, fluid in chambers 224, 225 represented by arrows 281 (e.g., hydraulic fluid) is exhausted into circuit 260, where it may be vented or recycled. In particular, fluid in open chamber 225 flows into circuit 260, fluid in chamber 224 flows into chamber 23 of valve 10, fluid in chamber 23 flows into open chamber 22 of valve 10, and fluid in chamber 22 flows into circuit 260. As piston 230 continues to be pushed in the first axial direction 290, shear ram 131a moves radially into main bore 133 and transitions to the closed position.

Referring now to FIG. 11, to radially withdraw ram 131a from bore 133 (i.e., transition ram 131a to the open position), close chamber 21 of valve 10 and close chamber 223 of piston-cylinder assembly 210 are vented via first fluid circuit 250, thereby allowing biasing member 87 to bias valve member 80 to the closed position and valve member 70 to the open position. Thus, chambers 23, 224 are in fluid communication with chamber 21 of valve 10 via bores 33 and annulus 34 and circuit 250 via port 26, and chamber 22 is isolated from chambers 23, 224. Next, pressurized fluid 280 (e.g., pressurized hydraulic fluid) is simultaneously supplied to open chamber 22 of valve 10 and open chamber 225 of piston-cylinder assembly 210 via supply/exhaust line 261. In general, pressurized fluid 280 may be supplied to circuit 260 by any suitable source including, without limitation, a pump or fluid accumulators. In this embodiment, pressurized fluid 280 is supplied to circuit 260 by one or more subsea hydraulic fluid accumulators connected to line 261 or from vessel 105 via one or more hydraulic lines extending subsea to line 261.

As piston 230 is moved axially in second direction 291 by fluid pressure within chamber 225, fluid 281 in chamber 223 is exhausted into circuit 250, fluid in chamber 23 is pulled into chamber 224, fluid in chamber 21 is pulled into chamber 23, and fluid in circuit 250 is pulled into chamber 21. The volume of fluid 281 in chamber 223 displaced by piston 230 is greater than the volume of fluid 281 pulled into chamber 224 due to the presence of piston section 231b extending through chamber 224 and occupying volume therein. Accordingly, more fluid 281 is exhausted into circuit 250 than is pulled from circuit 250 into chamber 21. The net excess fluid 281 exhausted into circuit 250 may be vented or recycled via line 251. As piston 230 continues to be pushed in the second axial direction 291, shear ram 131a is radially withdrawn from main bore 133 and transitions to the open position. In the manner described, application of pressurized hydraulic fluid to circuit 250 transitions shear ram 131a to the closed position by pressurizing close chambers 21, 223, and application of pressurized hydraulic fluid to circuit 260 transitions shear ram 131a to the open position by pressurizing open chambers 22, 225.

In general, opening a ram of a ram BOP (e.g., shear ram 131a) requires less axial force than closing the ram due to the pressure of fluids (e.g., formation fluids) in the main bore of the BOP stack (e.g., main bore 133 of BOP stack 130). Thus, it is typically not necessary to apply the same force to the piston to open the ram as is applied to close the ram. Further, it is typically desirable to minimize the volume of pressurized hydraulic fluid required to open and close a ram since supplying a sufficient volume of pressurized hydraulic fluid from the surface to actuate a ram may be challenging, and subsea accumulators contain a finite and limited volume of pressurized hydraulic fluid (between charges).

Conventional ram actuators utilize the same volume of pressurized hydraulic fluid to both open and close the ram, and substantially the same axial force to both open and close the ram. Accordingly, most conventional ram actuators inefficiently utilize hydraulic power—more axial force and hydraulic fluid volume are used to open the ram that is necessary. To the contrary, embodiments of actuator assemblies described herein (e.g., actuator assembly 200) offer the potential to more efficiently utilize hydraulic power by reducing pressurized hydraulic fluid demands to open ram 131a. In particular, the volume of pressurized hydraulic fluid required to open ram 131a is less than the volume of hydraulic fluid required to close ram 131a, and further, and the axial force applied to piston 230 to open ram 131a is less than the axial force applied to piston 230 to close ram 230. This is the case because radii $R_{221b}$, $R_{231b}$ are less than radii $R_{221a}$, $R_{231a}$, and thus, the volume of pressurized hydraulic fluid required to move piston 230 a given axial distance in direction 291 to open ram 131a is less than the volume of pressurized hydraulic fluid required to move piston 230 the same axial distance in direction 290 to close ram 131a. By decreasing the volume of pressurized hydraulic fluid to open ram 131a, the demands placed on the pressurized hydraulic fluid supplied from the surface and/or by subsea accumulators to open ram 131a is reduced. The reduction in the volume of pressurized hydraulic fluid to open ram 131a is equal to the volume of chamber 224.

One of ordinary skill appreciates that the hydraulic fluid in chamber 224 is generally at the same pressure as the chamber 223, 225 with which it is in fluid communication (i.e., chamber 225 during closing of ram 131a and chamber 223 during opening of ram 131a). In this sense, chamber 224 may be referred to as a neutral or balance chamber. For example, while closing of ram 131a, pressurized hydraulic fluid is provided to chamber 223, valve member 70 closes and chamber 224 is in fluid communication with the unpressurized chamber 225; and while opening ram 131a, pressurized hydraulic fluid is provided to chamber 225, valve member 80 closes and chamber 224 is in fluid communication with the unpressurized chamber 223. Thus, the pressure of hydraulic fluid in chamber 224 does not need to be controlled or regulated independent of chambers 223, 225; the hydraulic fluid in chamber 224 merely reacts to the pressurized hydraulic fluid supplied to chamber 223 or chamber 225. This eliminates the need for dedicated accumulators to provide pressurized hydraulic fluid to chamber 224, and eliminates a hydraulic fluid storage device to: (a) supply hydraulic fluid to chamber 224 when ram 131a is opened, and (b) receive hydraulic fluid from chamber 224 when ram 131a is closed.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. A valve for controlling the flow of a fluid in a subsea assembly, comprising:
   a housing comprising a longitudinal axis and including a first chamber, a second chamber, and a neutral chamber positioned axially between the first chamber and the second chamber;
   an elongate stem slidable within the housing and extending axially through the neutral chamber, the stem comprising a first end and a second end opposite the first end;
   a first valve member at least partially located in the first chamber and connected to the first end of the stem, wherein the first valve member has a closed position seated in a first annular valve seat positioned axially between the first chamber and the neutral chamber and an open position spaced apart from the first valve seat;
   a second valve member at least partially located in the second chamber and connected to the second end of the stem, wherein the second valve member has a closed position seated in a second annular valve seat positioned axially between the second chamber and the neutral chamber and an open position spaced apart from the second valve seat; and
   a biasing member positionable in at least one of the first chamber, the second chamber, and the neutral chamber, the biasing member being configured to bias at least one of the first valve member and the second valve member.

2. The valve of claim 1, further comprising:
   a first port extending through the housing and in fluid communication with the first chamber;
   a second port extending through the housing and in fluid communication with the second chamber; and
   a neutral port extending through the housing and in fluid communication with the neutral chamber.

3. The valve of claim 1, further comprising:
   a first fluid flow path extending axially from the neutral chamber to the first valve seat; and a second fluid path extending axially from the neutral chamber to the second valve seat.

4. The valve of claim 3, wherein:
the housing includes a first wall axially positioned between the first chamber and the neutral chamber and a second wall axially positioned between the second chamber and the neutral chamber;
the stem extends axially through a throughbore in the first wall and a throughbore in the second wall; and
the first fluid flow path extends through the first wall and the second fluid flow path extends through the second wall.

5. The valve of claim 4, wherein:
the first fluid flow path comprises an annulus disposed about the stem and extending axially from the first valve seat and a plurality of circumferentially spaced bores disposed about the stem and extending from the annulus to the neutral chamber; and
the second fluid flow path comprises an annulus disposed about the stem and extending axially from the second valve seat and a plurality of circumferentially spaced bores disposed about the stem and extending from the annulus to the neutral chamber.

6. The valve of claim 1, wherein:
the first chamber is in fluid communication with the neutral chamber when the first valve member is in the open position; and
the second chamber is in fluid communication with the neutral chamber when the second valve member is in the open position.

7. The valve of claim 6, wherein:
the first chamber is not in fluid communication with the neutral chamber when the first valve member is in the closed position; and
the second chamber is not in fluid communication with the neutral chamber when the second valve member is in the closed position.

8. The valve of claim 1, wherein the biasing member is positioned in the neutral chamber.

9. The valve of claim 1, wherein the valve is in fluid communication with an actuator assembly of a blowout preventer ("BOP"), the actuator assembly configured to transition at least one of an opposed pair of rains located on the BOP from an open position withdrawn from a main bore of the BOP to a closed position extending into the main bore of the BOP.

10. A system for drilling a subsea wellbore, the system comprising:
a blowout preventer ("BOP") comprising a main bore and a pair of opposed rams, each rain having an open position withdrawn from the main bore and a closed position extending into the main bore; and
a valve configured to facilitate actuation of the BOP rams, the valve comprising:
a housing comprising a longitudinal axis and including a first chamber, a second chamber, and a neutral chamber positioned axially between the first chamber and the second chamber;
a first valve member at least partially located in the first chamber, wherein the first valve member has a closed position seated in a first annular valve seat and an open position spaced apart from the first valve seat;
a second valve member at least partially located in the second chamber, wherein the second valve member has a closed position seated in a second annular valve seat and an open position spaced apart from the second valve seat; and
a biasing member positionable in at least one of the first chamber, the second chamber, and the neutral chamber, the biasing member being configured to bias at least one of the first valve member and the second valve member.

11. The system of claim 10, wherein the valve includes a stem slidably disposed in the housing, wherein the stem comprises a first end connected to the first valve member and a second end connected to the second valve member.

12. The system of claim 10, wherein the biasing member is configured to bias the second valve member to the closed position and the first valve member to the open position.

13. The system of claim 10, further comprising:
an actuator assembly configured to transition one rain between the open position and the closed position, wherein the actuator assembly comprises:
a cylinder comprising an inner cavity;
a piston slidingly disposed in the cylinder, wherein the piston divides the inner cavity of the cylinder into a close chamber, an open chamber, and a neutral chamber positioned between the open chamber and the close chamber; and
a connecting rod coupled to the piston and the ram.

14. The system of claim 13, wherein:
the first valve member is engaged with the first valve seat in the closed position and is axially spaced from the first valve seat in the open position; and
the second valve member is engaged with the second valve seat in the closed position and is axially spaced from the second valve seat in the open position.

15. The system of claim 14, wherein the first valve member forms an annular metal-to-metal seal with the first valve seat in the closed position and the second valve member forms an annular metal-to-metal seal with the second valve seat in the closed position.

16. The system of claim 15, wherein the close chamber has a diameter and the open chamber has a diameter less than the diameter of the close chamber.

17. The system of claim 13, wherein:
the close chamber is in fluid communication with the first chamber, the valve neutral chamber, and the cylinder neutral chamber when the first valve member is in the open position; and
the open chamber is in fluid communication with the second chamber, the valve neutral chamber, and the cylinder neutral chamber when the second valve member is in the open position.

18. The system of claim 13, wherein:
the inner cavity includes a central axis and extends axially through the cylinder between a first end and a second end, wherein the inner cavity includes a first portion having a first radius and a second portion having a second radius that is less than the first radius; and
the piston includes a first section that slidingly engages the cylinder in the first portion of the inner cavity and a second section that slidingly engages the cylinder in the second portion of the inner cavity.

19. The system of claim 18, wherein the close chamber extends axially from the first end of the inner cavity to the first section of the piston, the open chamber extends axially from the second end of the inner cavity to the second section of the piston, and the cylinder neutral chamber is located about the second section of the piston and within the first portion of the inner cavity.

20. The system of claim 17, further comprising:
- a first fluid circuit in fluid communication with the close chamber, the first chamber, and a source of pressurized fluid;
- a second fluid circuit in fluid communication with the open chamber, the second chamber, and a source of pressurized fluid; and
- a flow line extending from the cylinder neutral chamber to the valve neutral chamber.

* * * * *